(12) United States Patent  
Jung et al.

(10) Patent No.: US 11,924,949 B2
(45) Date of Patent: Mar. 5, 2024

(54) REMOVABLE KNOB SWITCH DEVICE AND INDUCTION HEATING COOKER USING KNOB SWITCH

(71) Applicant: LG ELECTRONICS INC., Seoul (KR)

(72) Inventors: Byungsang Jung, Seoul (KR); Gyunghwan Yuk, Seoul (KR); Seong Hun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 496 days.

(21) Appl. No.: 17/257,115

(22) PCT Filed: Jun. 11, 2019

(86) PCT No.: PCT/KR2019/007018
§ 371 (c)(1),
(2) Date: Dec. 30, 2020

(87) PCT Pub. No.: WO2020/013456
PCT Pub. Date: Jan. 16, 2020

(65) Prior Publication Data
US 2021/0235552 A1    Jul. 29, 2021

(30) Foreign Application Priority Data
Jul. 13, 2018  (KR) .................. 10-2018-0081724

(51) Int. Cl.
*H05B 6/06*  (2006.01)
*F24C 7/08*  (2006.01)
(Continued)

(52) U.S. Cl.
CPC ............. *H05B 6/062* (2013.01); *F24C 7/083* (2013.01); *H05B 1/0266* (2013.01); *H05B 6/12* (2013.01)

(58) Field of Classification Search
CPC .... H05B 1/0266; H05B 6/062; H05B 6/1209; H05B 6/12; F24C 7/083; Y02B 40/00
See application file for complete search history.

(56) References Cited

U.S. PATENT DOCUMENTS

| 2010/0149001 | A1* | 6/2010 | Yamanoue | ........... | G01D 5/2412 341/35 |
| 2017/0303346 | A1* | 10/2017 | Kang | ..................... | H05B 6/062 |
| 2019/0297688 | A1* | 9/2019 | Parachini | .................. | F24C 7/06 |

FOREIGN PATENT DOCUMENTS

| EP | 2 709 423 A1 | 3/2014 |
| EP | 2 955 977 A1 | 12/2015 |

(Continued)

*Primary Examiner* — Dana Ross
*Assistant Examiner* — Kuangyue Chen
(74) *Attorney, Agent, or Firm* — Birch, Stewart, Kolasch & Birch, LLP

(57) ABSTRACT

The present disclosure relates to an induction heating device comprising: a heating coil provided in a main body; a knob switch, detachable from and attachable to a knob area formed on one surface of the main body, for adjusting a heating power of the heating coil by rotation when attached to the knob area; a resonance detecting unit for outputting a frequency pulse corresponding to an impedance inflection point that varies according to a degree of rotation of the knob switch; and a controller for controlling the heating power of the heating coil according to the frequency pulse.

13 Claims, 7 Drawing Sheets

(51) Int. Cl.
*H05B 1/02* (2006.01)
*H05B 6/12* (2006.01)

(56) References Cited

FOREIGN PATENT DOCUMENTS

| | | |
|---|---|---|
| EP | 3 190 341 A1 | 7/2017 |
| JP | 2017-162587 A | 9/2017 |
| KR | 10-2008-0055912 A | 6/2008 |
| KR | 10-2016-0028909 A | 3/2016 |
| KR | 10-2018-0025747 A | 3/2018 |
| KR | 20180025747 A * | 3/2018 |
| KR | 10-2018-0044766 A | 5/2018 |

* cited by examiner

【FIG. 1】
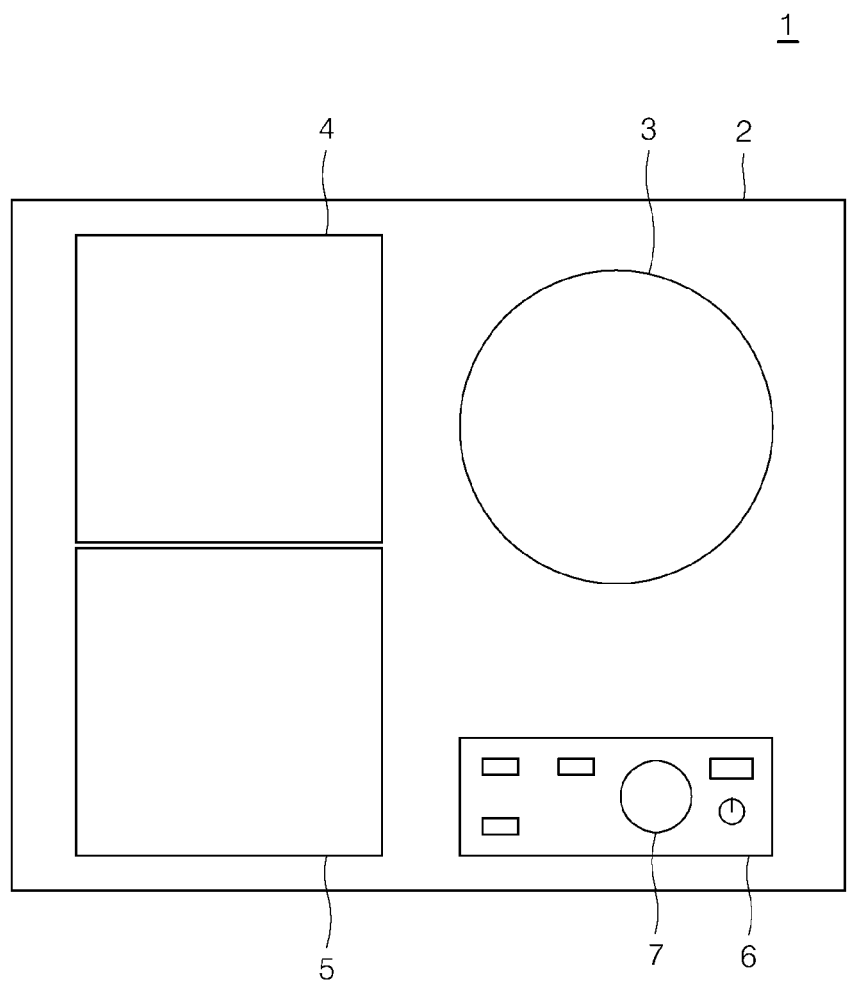

[FIG. 2]
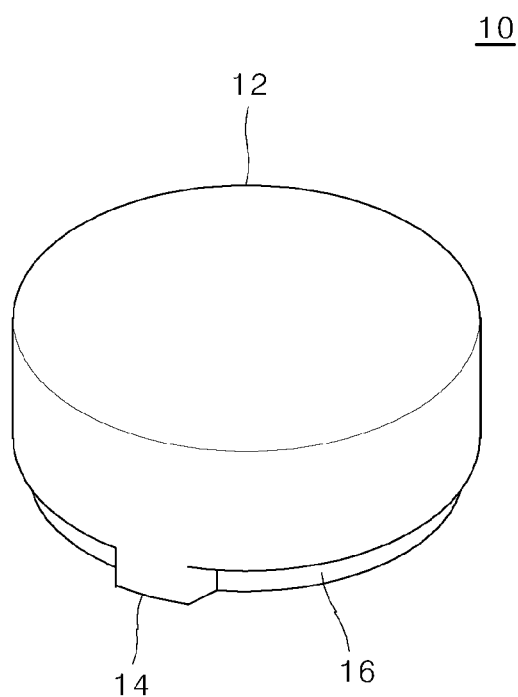

[FIG. 3]
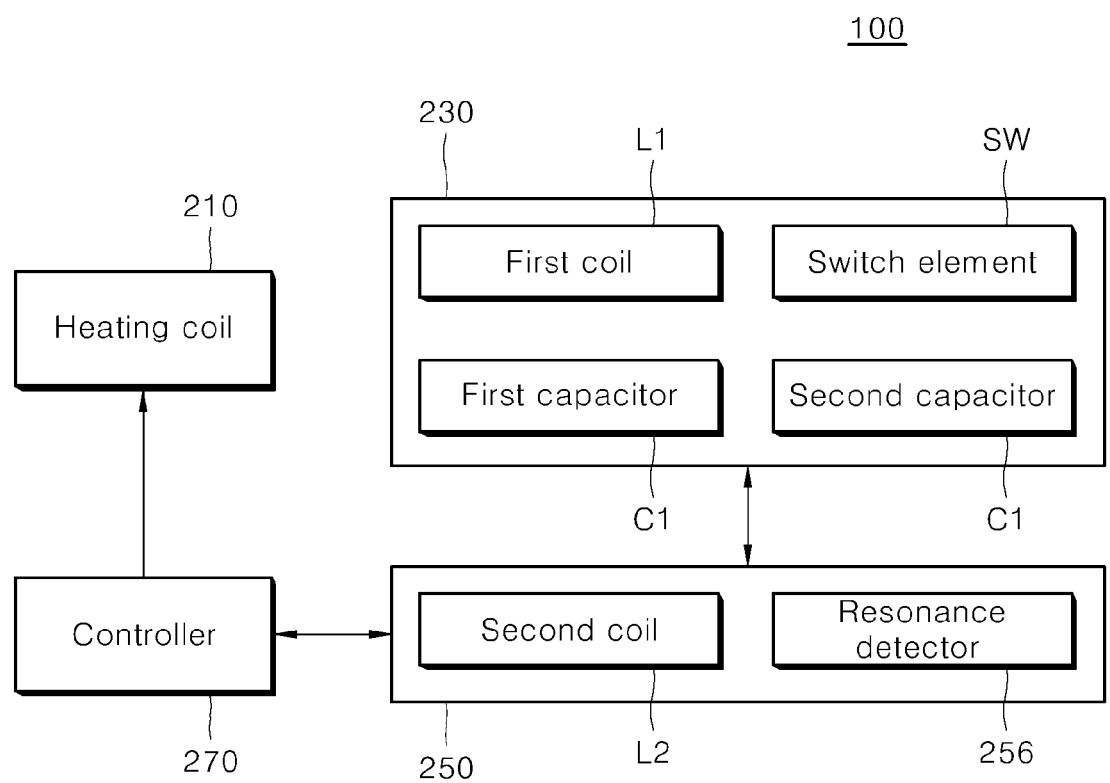

[FIG. 4]
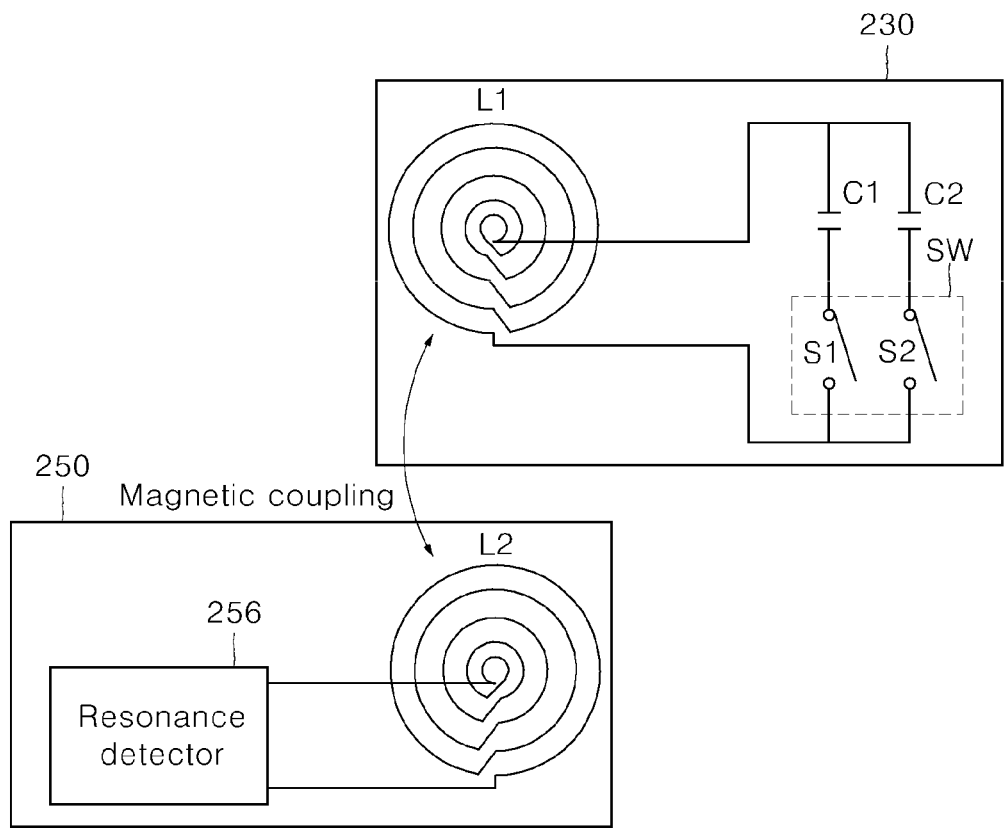

[FIG. 5]
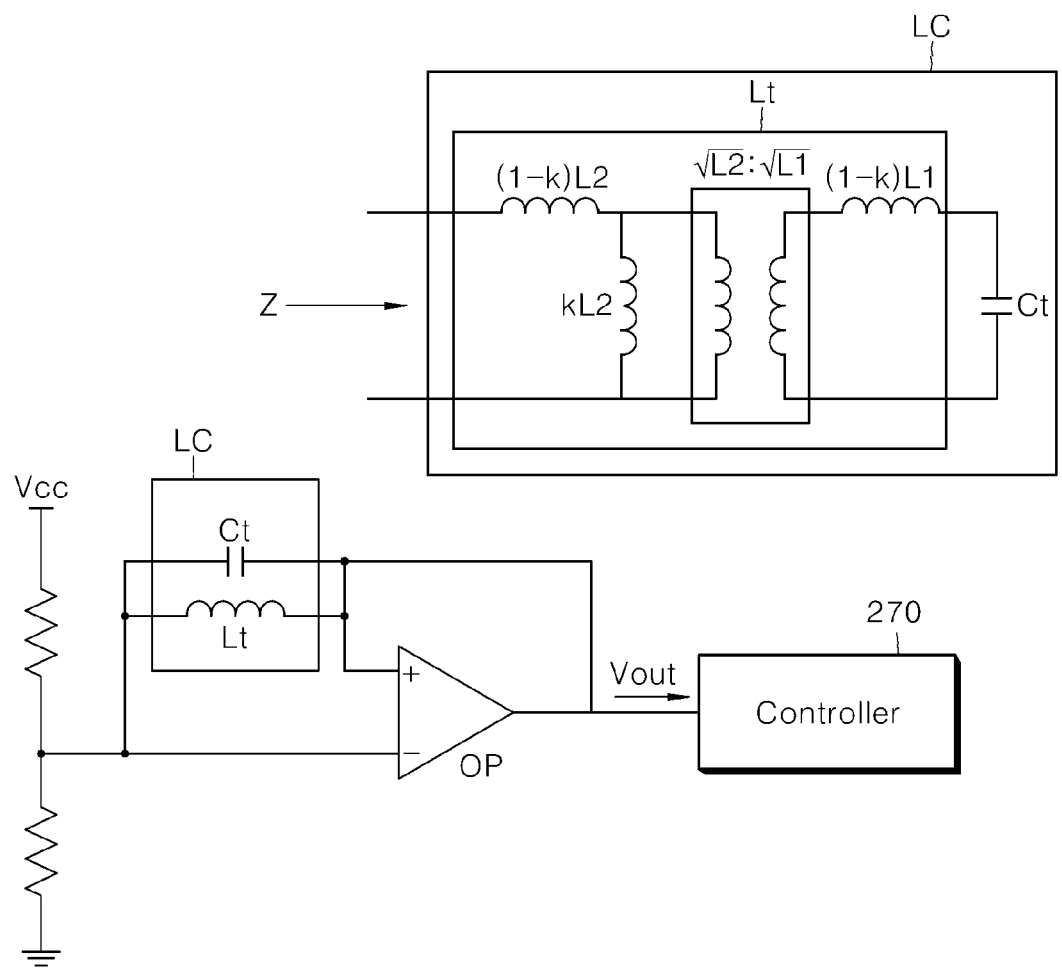

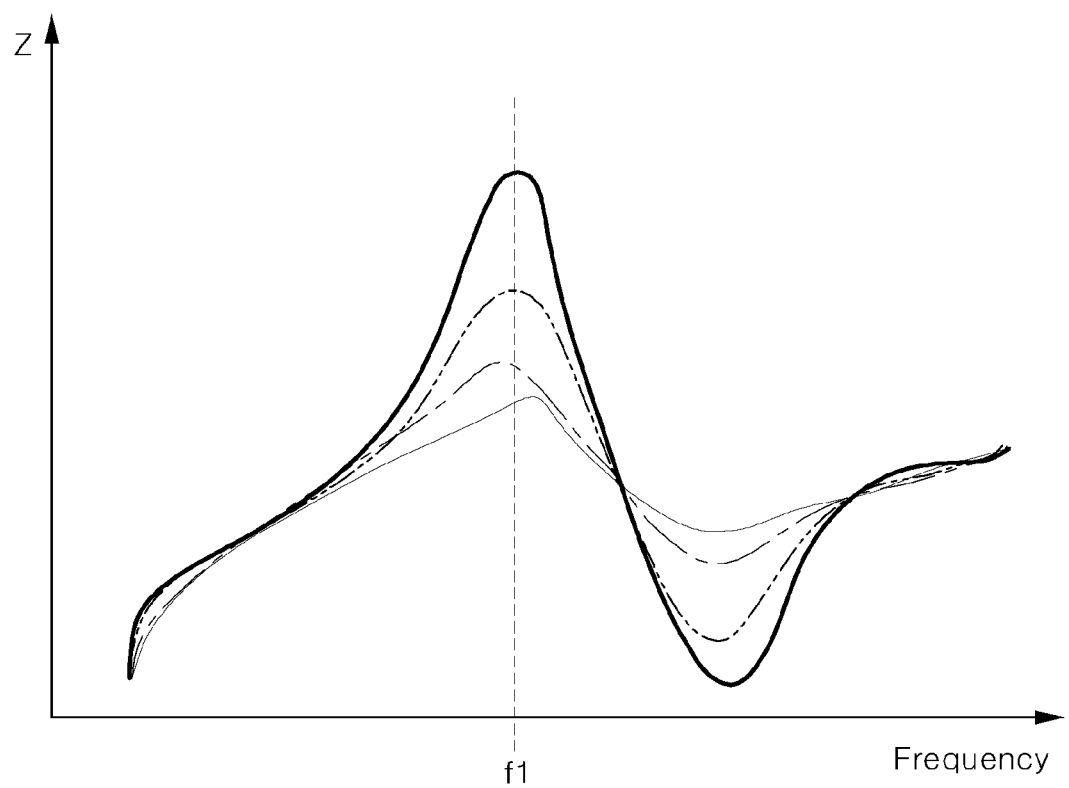
[FIG. 6]

[FIG. 7]
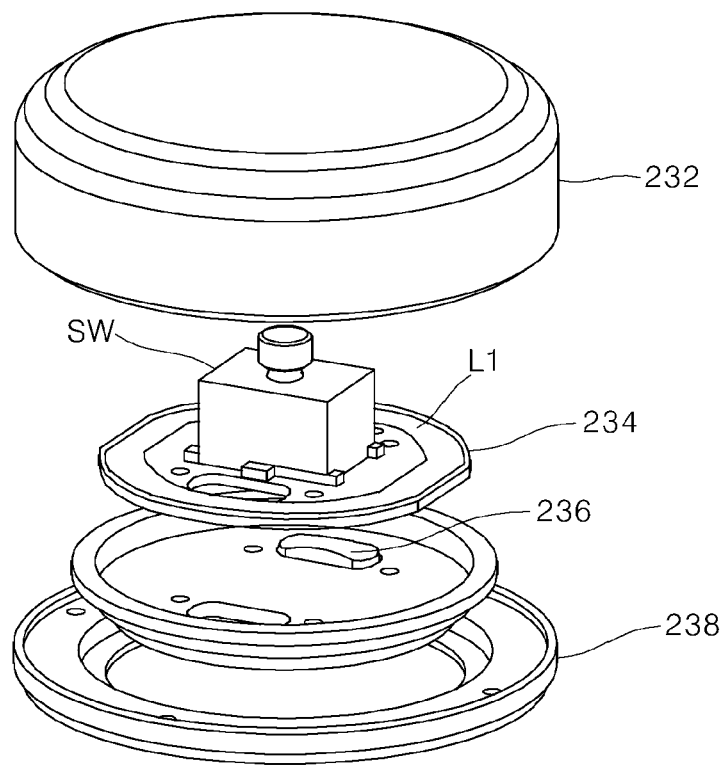

REMOVABLE KNOB SWITCH DEVICE AND INDUCTION HEATING COOKER USING KNOB SWITCH

CROSS REFERENCE TO RELATED APPLICATIONS

This application is the National Phase of PCT International Application No. PCT/KR2019/007018, filed on Jun. 11, 2019, which claims priority under 35 U.S.C. 119(a) to Patent Application No. 10-2018-0081724, filed in the Republic of Korea on Jul. 13, 2018, all of which are hereby expressly incorporated by reference into the present application.

TECHNICAL FIELD

Disclosed herein are an attachable knob switch apparatus and an induction heating device using a knob switch.

BACKGROUND ART

Cooking devices are used to cook food, and can cook food based on a user's intention. The cooking devices may be classified in various ways according to a heat source or type, and the sort of fuel.

Additionally, the devices can be divided into ovens, sealed type cooking devices and open type cooking devices, based on a way that cooks food.

In an oven, a cooking space where food is placed is sealed and the sealed space is heated to cook food. A sealed type cooking device can be a microwave oven that cooks food in a sealed space. An open type cooking device can be a cooktop (or a hob) that cook food in an open space.

Cooktops can use electricity as an energy source to cook food. In this case, the devices can keep a cooking area clean and emit no harmful gases. Additionally, the devices can provide various functions for cooking food. Thus, the devices can have higher energy efficiency than cooking devices to which a gas burner is applied.

A cooktop that uses a classic gas burner is provided with a dial-type knob switch. The knob switch is used to start a fire in a burner and adjust intensity of the fire.

However, for a cooktop using electricity, an analogue button the upper portion of which is covered or a touch method is adopted. As a result, the cooktop can have an integrated body. According to Korean Patent Publication No. 2016-0028909 as a related art, an induction device is provided with a knob switch attachable to and detachable from an upper portion thereof.

FIG. 1 is a top view showing an induction device of the related art.

The induction device denotes a cooking device that performs heating using an induction heating method.

Referring to FIG. 1, the induction device 1 can include a main body 2, a plurality of cooking areas 3, 4, 5 and a control input device 6.

The main body 2 is made off tempered glass having thermal resistance. The plurality of cooking areas 3, 4, 5 can denote positions of an upper surface of the main body 2, at which food or cookware containing food is placed.

The control input device 6 can control functions of the induction device 1 as a whole. That is, through the control input device 6, a user can turn on or turn off each of the cooking areas 3, 4, 5. Additionally, the control input device 6 can adjust a thermal power of each of the cooking areas 3, 4, 5.

In this case, the control input device 6 can have a knob area 7 where a knob switch (not illustrated) for adjusting a thermal power of each of the cooking areas 3, 4, 5 is placed.

That is, the knob switch can adjust a thermal power as a result of a rotation in a direction desired by the user.

FIG. 2 is a perspective view showing a knob switch of the related art.

Referring to FIG. 2, the knob switch 10 includes a knob member 12, a protrusion 14, and a first magnetic material 16.

The user can rotate the knob member 12 with the user's hand to rotate the knob switch 10. The knob member 12 can be connected to the protrusion 14.

The knob member 12 can be made of a conductive metallic material such that the knob member 12 touches touch sensors with the user's manipulation and electricity capacity is changed.

The protrusion 14 can protrude downward from the knob member 12 to a flat surface in a lower portion of the knob switch 10 such that the touch sensors around the knob area are touched.

The first magnetic material 16 can be formed at a lower side of the knob member 12 of the knob switch 10. In this case, the first magnetic material 16 can be a rotation axis when making a rotation. The first magnetic material 16 has a polarity opposite to a polarity of a second magnetic material disposed in the lower portion of the knob area, and the first magnetic material 16 can be attached to the knob area using an attractive force between the first magnetic material 16 and the second magnetic material.

An induction device of the related art uses a capacitive touch-type knob switch 10. To sense a rotation amount of the knob switch 10, the induction device needs to be provided with a plurality of touch sensors, resulting in an increase in manufacturing costs and a decrease in manufacturing efficiency.

DESCRIPTION OF INVENTION

Technical Problems

The present disclosure is directed to an induction heating device that may adjust a thermal power and prevent an operational error, based on a resonance characteristic between a knob switch, attached to the knob area, and a resonance detecting unit.

The present disclosure is also directed to an induction heating device that may adjust a thermal power based on a frequency pulse varied depending on a rotation degree of a knob switch.

Objectives are not limited to the above ones, and other objectives and advantages that have not been mentioned can be clearly understood from the following description and can be more clearly understood from the embodiments set forth herein. Further, the objectives and advantages can be realized via means and combinations thereof in the appended claims.

Technical Solutions

An induction heating device according to the present disclosure may adjust a thermal power of a heating coil using a frequency pulse based on a resonance characteristic between a knob switch, attached to the knob area, and a resonance detecting unit.

An induction heating device according to the present disclosure may adjust a thermal power of a heating coil based on a frequency pulse corresponding to an impedance inflection point varied depending on a rotation degree of a knob switch.

An induction heating device according to the present disclosure may include a heating coil provided in a main body; a knob switch attached to a knob area formed on one surface of the main body; a resonance detecting unit configured to output a frequency pulse based on a resonance characteristic between the resonance detecting unit and the knob switch, wherein the resonance characteristic is varied depending on a rotation of the knob switch; and a controller configured to control a thermal power of the heating coil based on a frequency pulse output by the resonance detecting unit.

The resonance detecting unit may output a frequency pulse corresponding to an impedance inflection point varied between the resonance detecting unit and the knob switch.

The impedance inflection point may be a frequency at which the amount of variation in impedance changes from rising to falling.

The knob switch may include a first coil, a first capacitor having a first capacitance value, a second capacitor having a second capacitance value different from the first capacitance value, and a switch element configured to perform a switching operation such that at least one of the first and second capacitors is connected in parallel with the first coil based on a rotation degree of the knob switch.

The knob switch may further include a third capacitor connected in parallel with the first coil.

The first coil may include a PCB pattern.

The switch element may be an incremental type encoder or an absolute encoder that performs a switching operation based on a set switching pattern corresponding to the rotation degree.

The switch element may be a push-button switch.

The main body may include a first magnetic material in the knob area, and the knob switch may further include a second magnetic material having a polarity opposite to a polarity of the first magnetic material and generating an attractive force along with the first magnetic material.

The resonance detecting unit may include a second coil magnetically coupled to the first coil, and a resonance detector configured to output a frequency pulse corresponding to an impedance inflection point based on a resonance characteristic by the first coil, the second coil and at least one of the first and second capacitors.

The impedance inflection point may vary depending on a capacitance value of at least one of the first and second capacitors.

The resonance detector may supply a voltage for each frequency such that the frequency pulse is output.

The resonance detector may include an OP-amp.

An induction heating device according to the present disclosure may include a knob switch attached to a knob area formed on one surface of a main body; a resonance detecting unit configured to output a frequency pulse based on a resonance characteristic between the resonance detecting unit and the knob switch, wherein the resonance characteristic is varied depending on a rotation of the knob switch; and a controller configured to control an electronic device corresponding to the main body based on a frequency pulse output by the resonance detecting unit.

The knob switch may include a first coil, a first capacitor having a first capacitance value, a second capacitor having a second capacitance value different from the first capacitance value, and a switch element configured to perform a switching operation such that at least one of the first and second capacitors is connected in parallel with the first coil based on a rotation degree of the knob switch.

The switch element may be an incremental type encoder or an absolute encoder that performs a switching operation based on a set switching pattern corresponding to the rotation degree, or a push-button switch.

The main body may include a first magnetic material in the knob area, and the knob switch may further include a second magnetic material having a polarity opposite to a polarity of the first magnetic material and generating an attractive force along with the first magnetic material.

The resonance detecting unit may include a second coil magnetically coupled to the first coil, and a resonance detector configured to output a frequency pulse corresponding to an impedance inflection point based on a resonance characteristic by the first coil, the second coil and at least one of the first and second capacitors.

The impedance inflection point may vary depending on a capacitance value of at least one of the first and second capacitors.

The resonance detector may include an OP-amp.

Advantageous Effects

An induction heating device according to one embodiment may adjust a thermal power of a heating coil using a frequency pulse based on a resonance characteristic between a knob switch and a resonance detecting unit, thereby ensuring a reduction in manufacturing costs and a simplification of a manufacturing process.

An induction heating device according to one embodiment may adjust a thermal power of a heating coil based on a frequency pulse corresponding to an impedance inflection point varied depending on a rotation degree of a knob switch, thereby enhancing accuracy of adjustment of the thermal power of the heating coil.

Specific effects are described together with the above-described effects in the section of Detailed Description.

BRIEF DESCRIPTION OF DRAWINGS

FIG. 1 is a top view showing an induction device of the related art.

FIG. 2 is a perspective view showing a knob switch of the related art.

FIG. 3 is a control block diagram showing a configuration of control of an induction heating device according to an embodiment.

FIG. 4 is a circuit diagram schematically showing a knob switch and a resonance detecting unit in FIG. 3.

FIG. 5 is an equivalent circuit diagram showing a knob switch and a resonance detecting unit in FIG. 4.

FIG. 6 is a view showing an impedance curve seen from a second coil in the equivalent circuit diagram of FIG. 5.

FIG. 7 is an exploded perspective view showing a configuration of the knob switch in FIG. 3.

DETAILED DESCRIPTION OF EXEMPLARY EMBODIMENTS

Below, embodiments are described with reference to the accompanying drawings. In the drawings, like reference numerals denote like components.

An induction heating device according to one embodiment is described hereunder.

FIG. 3 is a control block diagram showing a configuration of control of an induction heating device according to an embodiment.

An induction heating device 100 may include a heating coil 210, a knob switch 230 and a resonance detecting unit 250 and a controller 270.

The induction heating device 100 may include an upper plate (not illustrated) and a case body (not illustrated) that supports the upper plate.

On the upper plate, a knob area (not illustrated) in which the knob switch 230 is attachable and detachable may be displayed. Additionally, on the upper plate, food or a vessel containing food may be placed. The upper plate may be made of tempered glass.

The case body may support the upper plate. In the case body, components such as the heating coil 210, the knob switch 230, the resonance detecting unit 250, the controller 270 and the like may be disposed. The case body may be made of metal or reinforced plastics.

The heating coil may generate thermal power based on control of the controller 270.

The knob switch 230 may include a first coil (L1), a first capacitor (C1), a second capacitor (C2) and a switch element (sw).

The first coil (L1) may be connected in parallel with at least one of the first and second capacitors (C1 and C2) as a result of a switching operation of the switch element (sw).

In this case, the first coil (L1) may constitute an LC parallel resonance circuit along with at least one of the first and second capacitors (C1 and C2).

The first capacitor (C1) may have a first capacitance value, and the second capacitor (C2) may have a second capacitance value different from the first capacitance value.

The switch element (sw) may be an incremental type encoder or an absolute encoder.

When a knob of the knob switch 230 is rotated, the switch element (sw) may perform a switching operation based on a set switching pattern corresponding to a degree of the rotation of the knob.

The switching pattern is a pattern in which the first capacitor (C1) and the second capacitor (C2) are consecutively connected in parallel with the first coil (L1) based on a 90-degree rotation cycle of the knob.

For example, [Table 1] below shows the switching pattern.

TABLE 1

| | First capacitor (C1) | Second capacitor (C2) |
|---|---|---|
| 90° | Turn on | Turn off |
| 180° | Turn off | Turn on |
| 270° | Turn on | Turn off |
| 360° | Turn off | Turn on |

[Table 1] shows that the switch element (sw) may perform a switching operation such that the first capacitor (C1), the second capacitor (C2), the first capacitor (C1) and the second capacitor (C2) are consecutively connected in parallel with the first coil (L1), in the case of a 90-degree, 180-degree, 270-degree and 360-degree rotation. [Table 1] is provided only as an example but not limited.

The case body may include a first magnetic material (not illustrated) in a lower portion of the knob area, and the knob switch 230 may include a second magnetic material (not illustrated) having an opposite polarity to the first magnetic material. The second magnetic material (not illustrated) may generate an attractive force along with the first magnetic material to attach the that the knob switch 230 to the knob area.

The resonance detecting unit 250 may include a second coil (L2) and resonance detector 256.

The second coil (L2) may be magnetically coupled to the first coil (L1) of the knob switch 230. The second coil (L2) may be magnetically coupled to a parallel resonance circuit of the knob switch 230 to constitute an integrated LC parallel resonance circuit.

The resonance detector 256 may output a frequency pulse corresponding to an impedance inflection point by the first coil (L1), the second coil (L2), and at least one of the first and second capacitors (C1 and C2).

The impedance inflection point may be an impedance value at which an impedance gradient of the first coil (L1), the second coil (L2), and at least one of the first and second capacitors (C1 and C2) increases and then decreases. The frequency pulse may be a frequency corresponding to the impedance value.

As a result, the impedance inflection point may vary depending on a capacitance value of at least one of the first and second capacitors (C1 and C2).

The resonance detector 256 may include an OP-amp. To output the frequency pulse, the OP-amp may supply a voltage for each frequency, and output the frequency pulse corresponding to the capacitance value of at least one of the first and second capacitors (C1 and C2).

When the frequency pulse is input, the controller 270 may adjust a thermal power of the heating coil 210 based on a frequency of the frequency pulse.

FIG. 4 is a circuit diagram schematically showing a knob switch and a resonance detecting unit in FIG. 3. FIG. 5 is an equivalent circuit diagram showing a knob switch and a resonance detecting unit in FIG. 4. FIG. 6 is a view showing an impedance curve seen from a second coil in the equivalent circuit diagram of FIG. 5.

A knob switch 230 may include a first coil (L1), a first capacitor (C1), a second capacitor (C2), and a switch element (sw).

The first coil (L1) may be connected in parallel with at least one of the first and second capacitors (C1 and C2) as a result of a switching operation of the switch element (sw).

The first capacitor (C1) may be connected in series with a first switch (s1) of the switch element (sw), and the second capacitor (C2) may be connected in series with a second switch (s2) included in the switch element (sw).

That is, the first coil (L1) may be connected in parallel with the first capacitor (C1) and the first switch (s1), the first coil (L1) and the second capacitor (C2) and the second switch (s2) may be connected in parallel with the first capacitor (C1) and the first switch (s1).

When the knob of the knob switch 230 is rotated, the switch element (sw) may allow of a turn-on operation of at least one of the first and second switches (s1 and s2). In this case, the first coil (L1) may be connected in parallel with at least one of the first and second capacitors (C1 and C2).

A resonance detecting unit 250 may include a second coil (L2) and a resonance detector 256.

The second coil (L2) may be magnetically coupled to the first coil (L1), and the second coil (L2) may have a predetermined coupling coefficient (k).

As in FIG. 5, the resonance detector 256 may be implemented as an equivalent circuit.

In this case, an impedance curve seen form the second coil (L2) may be marked as in FIG. 7.

That is, the impedance curve in FIG. 6 may include a coefficient (k) of coupling between the first and second coils (L1 and L2), and an impedance value interpreted as a capacitor (Ct) of the first coil (L1), the second coil (L2), and at least one of the first and second capacitors (C1 and C2).

In this case, the resonance detector 250 may output, to the controller 270, a frequency pulse (Vout) of a frequency (f1) corresponding to an impedance inflection point where an impedance gradient of the impedance curve increases and then decreases and which is an impedance value.

$$f1 = \frac{1}{2\pi\sqrt{L_t C_t}} \quad \text{[Formula 1]}$$

Herein, f1 denotes a frequency, Lt denotes a coupling coil of the first and second coils (L1 and L2), and Ct denotes at least one of the first and second capacitors (C1 and C2).

That is, Lt may be a coupling coil corresponding to (1−k)L2, kL2, (1−k)L1 and a turn ratio ($\sqrt{2}:\sqrt{1}$) between and the first coil (L1) and the second coil (L2) shown in FIG. 6.

Herein, the resonance detector 250 may output a frequency pulse corresponding to a capacitance value of at least one capacitor (Ct) of the first and second capacitors (C1 and C2) that is varied by the switch element (sw) based on [Formula 1].

The controller 270 may recognize the capacitance value of the capacitor (Ct) based on the frequency pulse, and adjust a thermal power of the heating coil 210.

In one embodiment, two capacitors the first and second capacitors (C1 and C2)—are provided, but three or more capacitors may be provided.

For example, when three capacitors (first to third capacitors) are included, and the knob switch 230 is placed in the knob area, the first coil (L1) and the first capacitor included in the knob switch 230 constitute an LC parallel resonance circuit regardless of a switching operation of the switch element (sw) to confirm whether the knob switch 230 is attached.

Then the second and third capacitors may constitute an LC parallel resonance circuit and vary a resonance frequency depending on a switching operation of the switch element (sw).

In one embodiment, when a plurality of capacitors and a plurality of switches are provided, the knob switch 230 may segment and adjust a thermal power of the heating coil 210. That is, the knob switch 230 may vary a resonance frequency depending on a switching operation of each of the plurality of switches. In this case, the controller 270 may adjust electric power supplied to the heating coil 210 and adjust the thermal power of the heating coil 210 to correspond to the resonance frequency.

FIG. 7 is an exploded perspective view showing a configuration of the knob switch in FIG. 3.

A knob switch 230 may include an upper case 232, a printed circuit board 234, a second magnetic material 236, and a lower case 238.

The upper case 232 may be coupled to the lower case 238. Additionally, the upper case 232 may be the knob mentioned with reference to FIGS. 3 to 6.

The upper case 232 and the lower case 238 may be made of a plastic material. Additionally, the upper case 232 and the lower case 238 may protect the printed circuit board 234 and the second magnetic material 236.

The upper case 232 may have a space (not illustrated) into which the printed circuit board 234 and the second magnetic material 236 are inserted. The lower case 238 may have a hole (not illustrated) through which a part of the second magnetic material 236 protrudes outward.

The second magnetic material 236 may be inserted into a support case (not illustrated) coupled to the lower case 238. The second magnetic material 236 may be supported by the support case and exposed to the hole.

The first coil (L1), the first and second capacitors (C1 and C2) and the switch element (sw) may be mounted onto the printed circuit board 234. Herein, the switch (sw) may connected at least one of the first and second capacitors (C1 and C2) based on a degree of rotation of the knob switch 230.

The second magnetic material 236 may generate an attractive force along with the first magnetic material (not illustrated) disposed in a lower portion of the knob area of the upper plate described with reference to FIG. 3. In this case, the knob switch 230 may be attached to the knob area by the attractive force.

In one embodiment, to increase sensitivity of a resonance frequency, the second magnetic material 236 may be disposed not to overlap with the first coil (L1).

The embodiments described above can be replaced, modified and changed in various different forms by one having ordinary skill in the art within the scope of technical spirit of the disclosure. Thus, the embodiments should not be construed as being limited to the embodiments and drawings set forth herein.

The invention claimed is:

1. An induction heating device, comprising:
   a heating coil provided in a main body;
   a knob switch attached to a knob area formed on one surface of the main body;
   a resonance detecting unit configured to output a frequency pulse based on a resonance characteristic between the resonance detecting unit and the knob switch, wherein the resonance characteristic is varied depending on a rotation of the knob switch; and
   a controller configured to control a thermal power of the heating coil based on the frequency pulse output by the resonance detecting unit,
   wherein the knob switch comprises a first coil, a first capacitor having a first capacitance value, a second capacitor having a second capacitance value different from the first capacitance value, and a switch element that switches the first coil to be connected to the first capacitance or the second capacitor,
   wherein the resonance detecting unit comprises a second coil that is magnetically coupled to the first coil included in the knob switch and a resonance detector that outputs the frequency pulse, and
   wherein the resonance detector outputs the frequency pulse corresponding to a capacitance value of one of the first capacitor and the second capacitor connected to the first coil, based on the switching of the switch element.

2. The induction heating device of claim 1, wherein the resonance detecting unit outputs a frequency pulse corresponding to an impedance inflection point varied between the resonance detecting unit and the knob switch.

3. The induction heating device of claim 2, wherein the impedance inflection point is a frequency at which the amount of variation in impedance changes from rising to falling.

4. The induction heating device of claim 1,
   wherein the switch element is configured to perform a switching operation such that one of the first and second capacitors is connected in parallel with the first coil based on a rotation degree of the knob switch.

5. The induction heating device of claim 4, wherein the knob switch further comprises a third capacitor connected in parallel with the first coil.

6. The induction heating device of claim 4, wherein the first coil includes a PCB pattern.

7. The induction heating device of claim 4, wherein the switch element is an incremental type encoder or an absolute encoder that performs a switching operation based on a set switching pattern corresponding to the rotation degree.

8. The induction heating device of claim 4, wherein the switch element is a push-button switch.

9. The induction heating device of claim 4, wherein the main body comprises a first magnetic material in the knob area, and the knob switch further comprises a second magnetic material having a polarity opposite to a polarity of the first magnetic material and generating an attractive force along with the first magnetic material.

10. The induction heating device of claim 1, wherein the impedance inflection point varies depending on a capacitance value of one of the first and second capacitors.

11. The induction heating device of claim 1, wherein the resonance detector supplies a voltage for each frequency such that the frequency pulse is output.

12. The induction heating device of claim 1, wherein the resonance detector comprises an OP-amp.

13. The attachable knob switch apparatus of claim 1, wherein the resonance detector includes an OP-amp.

* * * * *